United States Patent
Parupudi et al.

(10) Patent No.: US 7,600,123 B2
(45) Date of Patent: Oct. 6, 2009

(54) CERTIFICATE REGISTRATION AFTER ISSUANCE FOR SECURE COMMUNICATION

(75) Inventors: Gopal Parupudi, Sammamish, WA (US); Prabhu Dutt Padhi, Sammamish, WA (US); Rajagopalan Badri Narayanan, Redmond, WA (US); Ram P. Sunkara, Redmond, WA (US); Sean A. Cannella, Bellevue, WA (US); Tak Chung Lung, Medina, WA (US); John Ellis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/318,066

(22) Filed: Dec. 22, 2005

(65) Prior Publication Data

US 2007/0150737 A1    Jun. 28, 2007

(51) Int. Cl.
*H04L 9/32* (2006.01)
(52) U.S. Cl. .............. 713/175; 713/156; 713/158; 380/286
(58) Field of Classification Search ......... 713/156–158, 713/175, 176, 172, 173; 726/10; 380/277–286; 705/64, 65, 75
See application file for complete search history.

(56) References Cited

U.S. PATENT DOCUMENTS

| | | | |
|---|---|---|---|
| 6,134,328 A | | 10/2000 | Cordery et al. |
| 6,148,404 A | * | 11/2000 | Yatsukawa ..................... 726/2 |
| 6,438,690 B1 | * | 8/2002 | Patel et al. .................. 713/156 |
| 6,715,073 B1 | | 3/2004 | An et al. |
| 6,859,879 B2 | | 2/2005 | Henn et al. |
| 6,892,300 B2 | | 5/2005 | Carroll et al. |
| 6,990,583 B2 | * | 1/2006 | Matsuyama et al. ......... 713/175 |
| 7,010,683 B2 | * | 3/2006 | Corella ....................... 713/156 |
| 7,409,553 B2 | * | 8/2008 | Kumagai et al. ............. 713/175 |
| 7,484,089 B1 | * | 1/2009 | Kogen et al. ................. 713/156 |
| 2001/0032310 A1 | * | 10/2001 | Corella ....................... 713/156 |
| 2001/0034833 A1 | * | 10/2001 | Yagasaki et al. ............. 713/156 |
| 2002/0032856 A1 | * | 3/2002 | Noguchi et al. ............. 713/156 |

(Continued)

FOREIGN PATENT DOCUMENTS

WO    WO/2004040845    5/2004

OTHER PUBLICATIONS

Ventuneac, Marian et al., "A Policy-Based Security Framework for Web-Enabled Applications," ACM International Conference Proceedings of the 1st International Symposium on Information and Communication Technologies, 2003.

(Continued)

*Primary Examiner*—Kimyen Vu
*Assistant Examiner*—Nirav Patel
(74) *Attorney, Agent, or Firm*—Perkins Coie LLP

(57) ABSTRACT

Techniques for registering certificates after the issuance of the certificates are provided. A service provider securely registers a client's identity and its certificate without depending on or using an existing basis of trust, such as that provided by domain-joined clients or a security directory (e.g., MICROSOFT's ACTIVE DIRECTORY). The service provider provides services, such as, by way of example and not a limitation, email services, web application services, application services, etc., based on identifiers (e.g., service IDs) issued to registered clients. The service provider subsequently uses the issued identifier to authenticate a client requesting a service or services, and to authorize the client to receive the requested service or services.

16 Claims, 8 Drawing Sheets

U.S. PATENT DOCUMENTS

| | | | |
|---|---|---|---|
| 2002/0069129 A1* | 6/2002 | Akutsu et al. | 705/26 |
| 2002/0144109 A1* | 10/2002 | Benantar et al. | 713/156 |
| 2003/0093676 A1* | 5/2003 | Kawamura et al. | 713/175 |
| 2003/0097566 A1* | 5/2003 | Kumagai et al. | 713/175 |
| 2003/0144865 A1 | 7/2003 | Lin et al. | |
| 2003/0163694 A1 | 8/2003 | Chen et al. | |
| 2003/0163701 A1* | 8/2003 | Ochi et al. | 713/175 |
| 2004/0030887 A1* | 2/2004 | Harrisville-Wolff et al. | 713/155 |
| 2004/0187013 A1 | 9/2004 | Heath et al. | |
| 2005/0010758 A1* | 1/2005 | Landrock et al. | 713/156 |
| 2005/0081028 A1* | 4/2005 | Thornton et al. | 713/156 |
| 2005/0120206 A1* | 6/2005 | Hines et al. | 713/158 |
| 2005/0262345 A1* | 11/2005 | Moreau | 713/173 |
| 2006/0100888 A1* | 5/2006 | Kim et al. | 705/1 |
| 2006/0195689 A1* | 8/2006 | Blecken et al. | 713/156 |

OTHER PUBLICATIONS

Entrust GetAccess for Web Portal Security, Copyright 2003 Entrust.
Seely, Scott, "Http Security and Asp.Net Web Services," Aug. 2002 http://mwdn.microsoft.com/library/en-us/dnwebsrv/html/httpsecurity.asp?frame=true.

* cited by examiner

Registration Table 112

| Service ID 204 | Certificate 206 | Subject Name 208 | Public Key 210 | Authorization Level 212 |
|---|---|---|---|---|
| 123 | --- | --- | --- | 0 |
| 345 | <CertA> | --- | PK1 | 1 |
| 567 | <CertB> | foobar@acme.com | PK2 | 2 |
| ... | ... | ... | ... | ... |

CERTIFICATE REGISTRATION AFTER ISSUANCE FOR SECURE COMMUNICATION

BACKGROUND

Today's enterprise applications and services have an increasing need to secure their communication. This is true whether the clients of these applications and services are present on the Internet or on the corporate intranet.

Digital certificates and PKI provide an appropriate infrastructure for enabling secure communication between these applications and services and their clients. One way to perform proper authentication and authorization (i.e., to provide services corresponding to a particular client) is to use a directory, such as MICROSOFT's ACTIVE DIRECTORY (AD). This allows the client's security identity in the directory to be used to perform both authentication and authorization.

However, use of a directory requires that the clients be joined to a domain. In the absence of such a directory and/or domain-joined clients, there is a need for a secure database that can be used to store the clients' identities and their corresponding security identities. This secure database needs to initially be populated through a registration process. Only after proper registration can the secure database be used to authenticate and/or authorize both domain-joined and non-domain-joined clients, such as computers, devices, cell phones, etc. One suitable way to populate the secure database is to do the registration at the time of certificate issuance. While this is suitable for new certificates, this does not work for certificates that have already been deployed.

SUMMARY

Techniques for registering certificates after the issuance of the certificates are provided. A service provider securely registers a client's identity and its certificate without depending on or using an existing basis of trust, such as that provided by domain-joined clients or a security directory (e.g., MICROSOFT's ACTIVE DIRECTORY). The service provider provides services, such as, by way of example and not a limitation, email services, web application services, application services, etc., based on identifiers (e.g., service IDs) issued to registered clients. The service provider subsequently uses the issued identifier to authenticate a client requesting a service or services, and to authorize the client to receive the requested service or services.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a block diagram that illustrates an example registration table utilized by a service provider, according to some embodiments.

DETAILED DESCRIPTION

Figure 1:
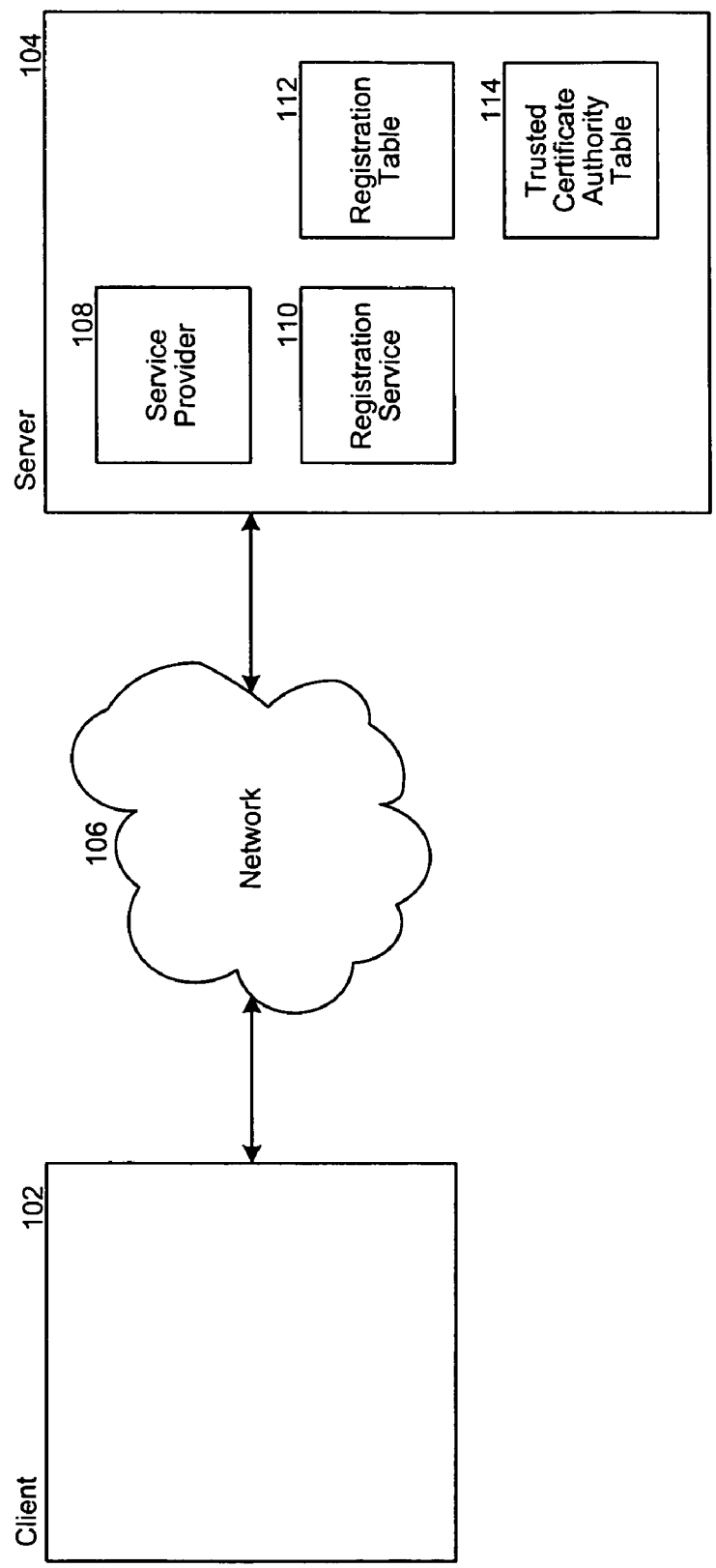
FIG. 1 is a high-level block diagram illustrating an example environment in which a certificate registration system may operate.

A software facility for registering certificates after issuance (the "facility") is provided. In some embodiments, the facility is used in conjunction with a service provider to allow the service provider to securely register a client's identity and its certificate without depending on or using an existing basis of trust, such as that provided by domain-joined clients or a security directory (e.g., MICROSOFT's ACTIVE DIRECTORY). The service provider provides services, such as, by way of example and not a limitation, email services, web application services, application services, etc., based on identifiers (e.g., service IDs) issued to registered clients. The service provider uses the issued identifier to authenticate a client requesting a service or services, and to authorize the client to receive the requested service or services. For example, once the service provider registers a client's certificate, the service provider issues the client a service ID for use by the client in requesting services from the service provider. When the service provider receives a request for services, the service provider can allow or deny the services based on the service ID that is passed with the request for services. In this manner, registration of a client's certificate is the process by which the client securely informs the service provider of its existence and provides the necessary information to the service provider such that any further communication between the client and the service provider is secure and trusted.

New Registration of an Issued Certificate

A client may detect a need to newly register an issued certificate with the service provider. For example, the need to register with the service provider may arise if the client has been freshly provisioned and does not yet have a service ID for use in interacting with the service provider. The issued certificate is a certificate that is issued by a trusted certificate authority or certification authority, such as VeriSign, CAcert, MICROSOFT Internal Certificate Authority, or any other trusted third party that issues certificates for use by other parties. To register the issued certificate, the client creates a certificate registration request, which contains information necessary for the registration, including the issued certificate. In some embodiments, the certificate registration request may be defined using XML. The client also creates a signature by signing a hash value using the private key that corresponds to the public key contained in the certificate. In some embodiments, the client creates the signature by hashing some data (e.g., the certificate registration request or some portion of the certificate registration request) using a hash function or algorithm, and then encrypting the hashed value using the private key. The hash function and the data that is hashed to create the signature are agreed upon a priori by the client and the service provider. The client sends the service provider a message containing the certificate registration request and the signature to request registration of the issued certificate. In some embodiments, the messages sent between the client and the service provider are encrypted using any of a variety of well-known cryptographic protocols, such as secure sockets layer (SSL) or transport layer security (TLS), to provide secure communications.

When the service provider receives the message, the service provider performs a series of validation checks on the certificate that is passed with the certificate registration request. For example, the service provider may check to determine that: the certificate was issued by a certificate authority that is known to and trusted by the service provider; the certificate has not expired; the certificate has client authentication capabilities (i.e., the certificate is a certificate that can be used for client authentication); and any of a variety of well-known validation checks to ensure that the certificate has not been tampered with. The service provider may maintain the list of certificate authorities that are known to and trusted in an appropriate trusted certificate authority table. If the certificate fails any of the validation checks, the service provider refuses the registration and generates an error condition. Otherwise, the service provider authenticates the identity of the client by verifying the signature passed with the certificate registration request (i.e., to verify that the client that sent the certificate registration request and the signature actually is in possession of the private key that matches the public key contained in the certificate). For example, the service provider creates a hash value using the agreed upon hash function and the data. The service provider then decrypts the received signature (i.e., the encrypted hash value) using the public key contained in the certificate, thus producing the decrypted hash value. The service provider then verifies the received signature by matching the hash value it created and the hash value that was produced by decrypting the signature using the public key. The signature is verified if the two hash values match. If the service provider fails to authenticate the client, the service provider refuses the registration and generates an error condition. Otherwise, the service provider checks to determine whether the client's identity is known to the service provider. In some embodiments, the client's identity is indicated by a unique token, such as, by way of example, the subject name, that is contained in the certificate. For example, the service provider can determine whether it knows the client by determining whether the subject name contained in the certificate is associated with a registration record corresponding to an existing registration (i.e., a valid registration or an invalid registration). Valid and invalid registrations are further discussed below. If the client's identity is not known to the service provider, the service provider newly registers the issued certificate by generating a service ID, associating the service ID to the client and, in particular, to the client's identity (e.g., the subject name contained in the certificate), and sending the client the service ID with a successful registration response. In some embodiments, the service provider maintains a record of the certificate registration in a registration table. If the client's identity is known to the service provider, the service provider renews the certificate registration that is associated with the client's identity. Renewal of a registration is further discussed below.

In some embodiments, the client may pass a service ID with the certificate registration request. For example, the client may have obtained a service ID as a result of a previous registration with the service provider. The previous registration may have been made using a "less trusted" certificate, such as, by way of example, a "no-certificate" registration (i.e., a registration by the client without the use of a certificate), a "self-issued certificate" registration (i.e., a registration by the client using a self-issued certificate), etc., or an issued certificate registration. When the service provider receives the service ID that is passed with the certificate registration request, the service provider checks to determine whether the passed service ID is valid. Stated differently, the service provider checks to determine whether it knows the passed service ID. For example, the service provider may determine that the passed service ID is valid if it was previously created and issued by the service provider. One way that the service provider can determine the validity of the passed service ID is by checking the registration records for the registered clients and/or the registered certificates (i.e., the registration records for the no-certificate registrations, the self-issued certificate registrations, and the issued certificate registrations) in the registration table. The registrations records may be for current registrations in the registration table, expired registrations that have not been purged from the registration table, or revoked registrations that have not been purged from the registration table. If the service provider determines that the passed service ID is not valid, the service provider newly registers the issued certificate that is passed with the certificate registration request using the passed service ID by associating the passed service ID to the client and, in particular, to the client's identity (e.g., the subject name contained in the certificate), and sending the passed service ID back to the client with a successful registration response. The service provider is able to newly register the client using the passed service ID because the client is requesting a service ID that does not exist (i.e., a service ID that is not known to the service provider), and the service provider can register the client using the requested service ID since the client is requesting registration of an issued certificate.

Otherwise, if the service provider determines that the passed service ID is valid (e.g., the passed service ID is known to the service provider), the service provider checks to determine whether the passed service ID was issued for a "non-issued certificate" registration. A non-issued certificate registration refers to all client registrations that did not involve an issued certificate (e.g., no-certificate registrations and self-issued certificate registrations). If the service provider determines that the valid service ID is for a non-issued certificate registration, the service provider updates the information associated with the non-issued certificate registration. For example, the service provider may update the registration record corresponding to this registration to indicate that the registration is now an issued certificate registration. The service provider may also include the issued certificate in the registration record. The service provider can then send the passed service ID back to the client with a successful registration response.

Otherwise, if the service provider determines that the valid service ID is for an issued certificate registration, the service provider refuses registration and generates an error condition. In this instance, the passed service ID is associated with an issued certificate registration and cannot be used to register the client's issued certificate, and the error condition can indicate that the passed service ID is already held by another issued certificate registration. Differentiating between issued certificate registrations and non-issued certificate registrations allows the service provider to support the concept of "authorization levels." For example, an issued certificate registration can be assigned a higher authorization level than a non-issued certificate registration. Moreover, a self-issued certificate registration can be assigned an authorization level that is higher than that assigned to a no-certificate registration. The concept of privilege systems allows a precedence order in which the service provider can use the authorization levels to allow a client registration at a higher authorization level to supersede (i.e., take over) a client registration at a lower authorization level. This is useful in upgrade scenarios (e.g., upgrade of the services to support additional/different features) and when a client switches modes of communication with the service provider from a non-secure communications mode to a secure communications mode. For example, the concept of authorization levels allows the service provider to maintain the continuity of a service ID as a registration progresses from a lower authorization level to a higher authorization level. Likewise, the client is able to continue using a service ID that was obtained as a result of a lower-authority registration even when upgrading to a higher-authority registration. This allows the service provider and the client to maintain and/or pick-up the history that is associated with the service ID.

In some embodiments, if the service provider determines that the valid service ID is for an issued certificate registration, the service provider can create a new registration for the client.

Renewal of a Registration

In some embodiments, the client may detect a need to renew a registration. For example, the need to renew with the service provider may arise when the client is issued a new certificate. For example, the client may be issued a new certificate prior to the client's previously issued certificate expiring or when the client's previous certificate registration is revoked, for example, by an administrator of the service provider. The client may renew a registration with the service provider using the new issued certificate when the client is currently registered with the service provider or when the client's previous registration with the service provider becomes invalid (e.g., the client's previous registration becomes expired, or when the client's previous registration with the service provider is revoked for some reason). A certificate registration becomes an expired registration when the certificate expires (i.e., when the certificate expires, the registration of the certificate with the service provider also becomes expired). Even thought a current registration becomes an expired registration the moment that the certificate expires, the expired registration may continue to be indicated as a valid registration until the service provider actually changes the status of the registration from valid to invalid (e.g., the service provider removes the registration record from the registration table). The administrator may revoke a registration by making an indication in the registration record maintained by the service provider. For example, a registration may be revoked as a result of client (e.g., laptop computer) that is associated with the certificate being stolen, as a result of inactivity, or any other reason deemed appropriate by the administrator.

To renew a registration using a new issued certificate, the client creates a certificate registration request, which contains information necessary for the registration, including the new issued certificate, as described above in conjunction with a new registration of an issued certificate. The client sends the service provider a message containing the certificate registration request and a signature to request renewal of a registration. When the service provider receives the message, the service provider validates the new issued certificate and authenticates the identity of the client. If the service provider fails to either validate the new issued certificate or authenticate the identity of the client, the service provider refuses the renewal of the registration and generates an error condition. Otherwise, the service provider checks to determine whether the client's identity is known to the service provider. For example, the service provider checks to determine whether the unique token, such as, by way of example, the subject name, that is contained in the certificate is associated with a valid registration or an invalid registration (e.g., an expired registration that has not been purged from the registration table or a revoked registration). If the client's identity is not known to the service provider, the service provider newly registers the issued certificate as described above. If the client's identity is known to the service provider, the service provider renews the registration that is associated with the client's identity by replacing the certificate that is associated with the registration with the new issued certificate, and sending the client a successful registration renewal response. In some embodiments, the service provider checks to determine whether the service ID that is associated with the registration record (i.e., the service ID that is associated with the client's registration) matches a service ID that is passed with the renewal request. If the service provider determines that the two service IDs match, then the service provider renews the registration by replacing the certificate that is currently in the registration record with the new issued certificate. This registration record is the registration record that corresponds to the client. Otherwise, if the service provider determines that the two service IDs do not match, or that the client did not pass a service ID with the renewal request, the service provider sends the client the service ID that is associated with the registration record with an indication to the client to start using the returned service ID. In this manner, the service provider can ensure that the client's registered certificate in the registration table is replaced with the new issued certificate as long as the unique token (e.g., subject name) contained in the certificate remains the same in both the registered certificate and the new issued certificate.

FIG. 1 is a high-level block diagram illustrating an example environment in which a certificate registration system may operate. The operating environment is only one example of a suitable operating environment and is not intended to suggest any limitation as to the scope of use or functionality of the certificate registration system. As depicted, the environment comprises a client 102 coupled to a server 104 through a network 106. The server comprises a service provider 108, a registration service 110, a registration table 112, and a trusted certificate authority table 114. The service provider functions to provide a service or multiple services to clients based on a submission of service IDs. The registration service functions to provide registration of the clients by registering issued certificates that are submitted by the clients. The registration service also provides renewal of client (i.e., certificate) registrations. The registration table contains a record for each client registration, which may have been made using an issued certificate or a self-issued certificate, or without using a certificate. The trusted certificate authority table contains a list of certificate authorities that are known to and trusted by the service provider. In general terms, the server functions to provide a platform on which the service provider, registration service and the registration table may execute and/or be maintained. The client functions to provide an application (not shown) that a user, such as a human user, can use to interact with the server to register an issued certificate and to request one or more of the services provided by the service provider. Only one server is shown in FIG. 1 for simplicity and one skilled in the art will appreciate that the one or more of the service provider, the registration service, and the registration table may be deployed on a plurality of servers. For example, the service provider may be distributed across multiple servers. Moreover, the service provider, the registration service, and the registration table may be deployed on the same server as depicted, or on different servers. As used herein, the terms "connected," "coupled," or any variant thereof, means any connection or coupling, either direct or indirect, between two or more elements; the coupling or connection between the elements can be physical, logical, or a combination thereof.

In general terms, the network is a communications link that facilitates the transfer of electronic content between, for example, the attached client and server. In some embodiments, the network includes the Internet. It will be appreciated that the network may be comprised of one or more other types of networks, such as a local area network, a wide area network, a point-to-point dial-up connection, and the like.

The computing device on which the certificate registration system, including the service provider, the registration service, and the registration table, is implemented may include a central processing unit, memory, input devices (e.g., keyboard and pointing devices), output devices (e.g., display devices), and storage devices (e.g., disk drives). The memory and storage devices are computer-readable media that may contain instructions that implement the certificate registration system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the certificate registration system, including the service provider, the registration service, and the registration table, may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The service provider, the registration service, and the registration table may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a block diagram that illustrates an example registration table utilized by a service provider, according to some embodiments. The registration table comprises registration records 202, and each registration record is shown comprising, by way of example, five fields including a service ID field 204, a certificate field 206, a subject name field 208, a public key field 210, and an authorization level field 212. Each registration record corresponds to a registration of a client with the service provider. A registration record may exist for no-certificate registrations, self-issued certificate registrations, and issued certificate registrations. The service ID field contains the service ID that was issued by the service provider as a result of the client registration, and which is used by the service provider to provide the services. The certificate field contains the certificate that may have been used in the corresponding registration. The subject name field contains the subject name, or any other unique token, that is contained in the certificate that may have been used in the corresponding registration. The public key field contains the public key that is contained in the certificate that may have been used in the corresponding registration. The authorization level field contains an indication of the authorization level assigned to the corresponding registration. By way of example and as illustrated in FIG. 2 is a registration record 214 that corresponds to a no-certificate registration. As such, the registration record corresponding to the no-certificate registration is shown as having entries in the service ID field (e.g., "123") and the authorization level field (e.g., "0"), but no entries in the certificate field, the subject name field, and the public key field, since these fields contain information that is typically associated with a certificate. Also illustrated in FIG. 2 is a registration record 216 and a registration record 216 which correspond to a self-issued certificate registration and an issued certificate registration, respectively. The registration record corresponding to the self-issued certificate registration is shown as having entries in the service ID field (e.g., "345"), the certificate field (e.g., "<certA>"), the public key field (e.g., "PK1"), and the authorization level field (e.g., "1"), but no entry in the subject name field because a self-issued certificate typically does not contain a subject name or other unique identifier that can be trusted and used to uniquely identify the client. The registration record corresponding to the issued certificate registration is shown as having entries in the service ID field (e.g., "567"), the certificate field (e.g., "<certB>"), the subject name field (e.g., foobar@acme.com), the public key field (e.g., "PK2"), and the authorization level field (e.g., "2").

Figure 3:
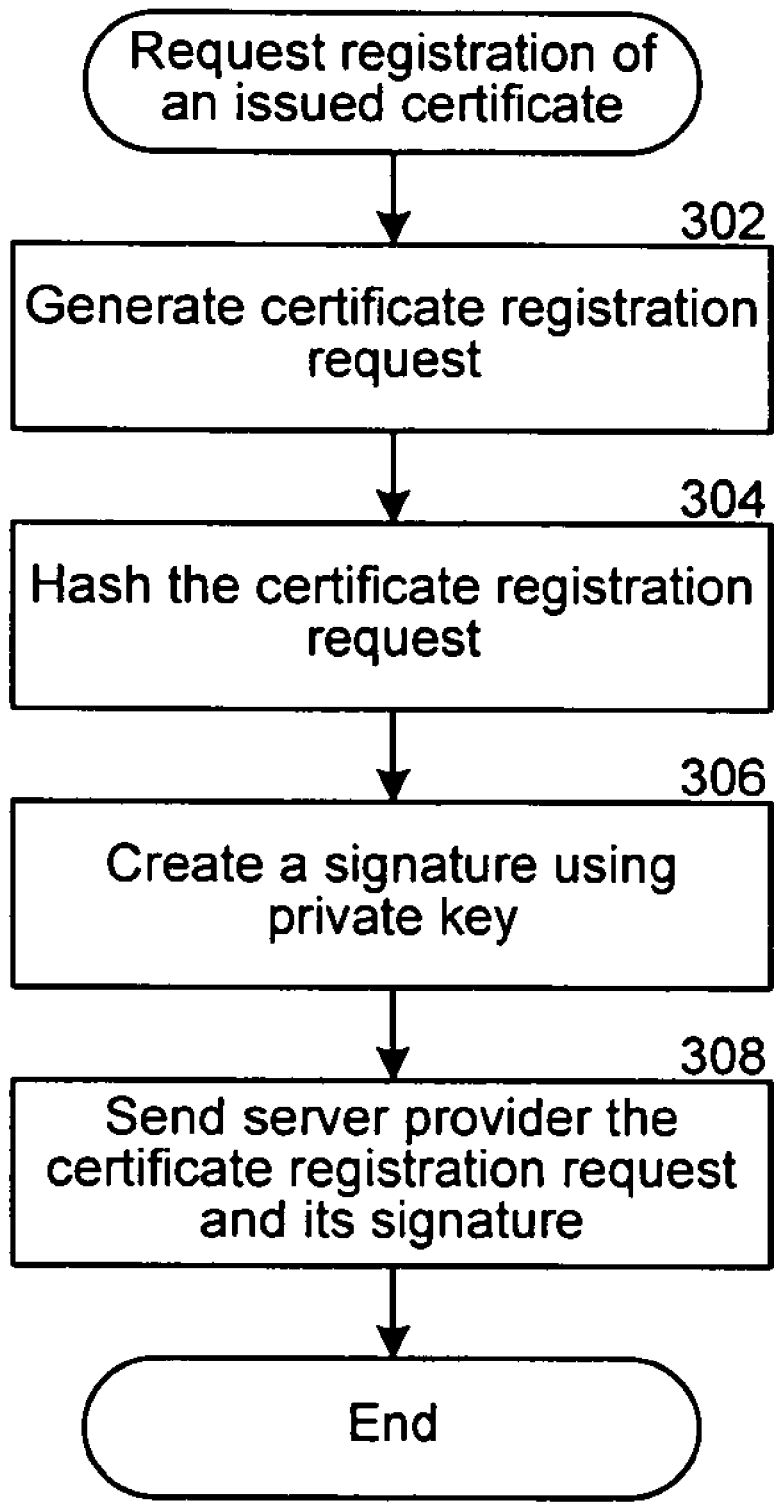
FIG. 3 is a flow diagram that illustrates the processing of a client in requesting the registration of an issued certificate with the service provider, according to some embodiments.

FIG. 3 is a flow diagram that illustrates the processing of a client in requesting the registration of an issued certificate with the service provider, according to some embodiments. The client may request the registration of an issued certificate to newly (i.e., "freshly,") register the issued certificate with the service provider or to renew a previous registration with the service provider. In block 302, the client generates a certificate registration request. The certificate registration request contains an issued certificate that the client desires to register with the service provider along with any other information that is necessary for the service provider to register passed issued certificate. In block 304, the client hashes the certificate registration request using a hash function that is known to and agreed upon by both the client and the service provider. In block 306, the client creates a signature by signing (i.e., encrypting) the hashed value generated in block 304 with a private key that corresponds to a public key that is contained in the issued certificate. In block 308, the client sends the service provider the certificate registration request and its signature to request registration of the issued certificate with the service provider.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 4:
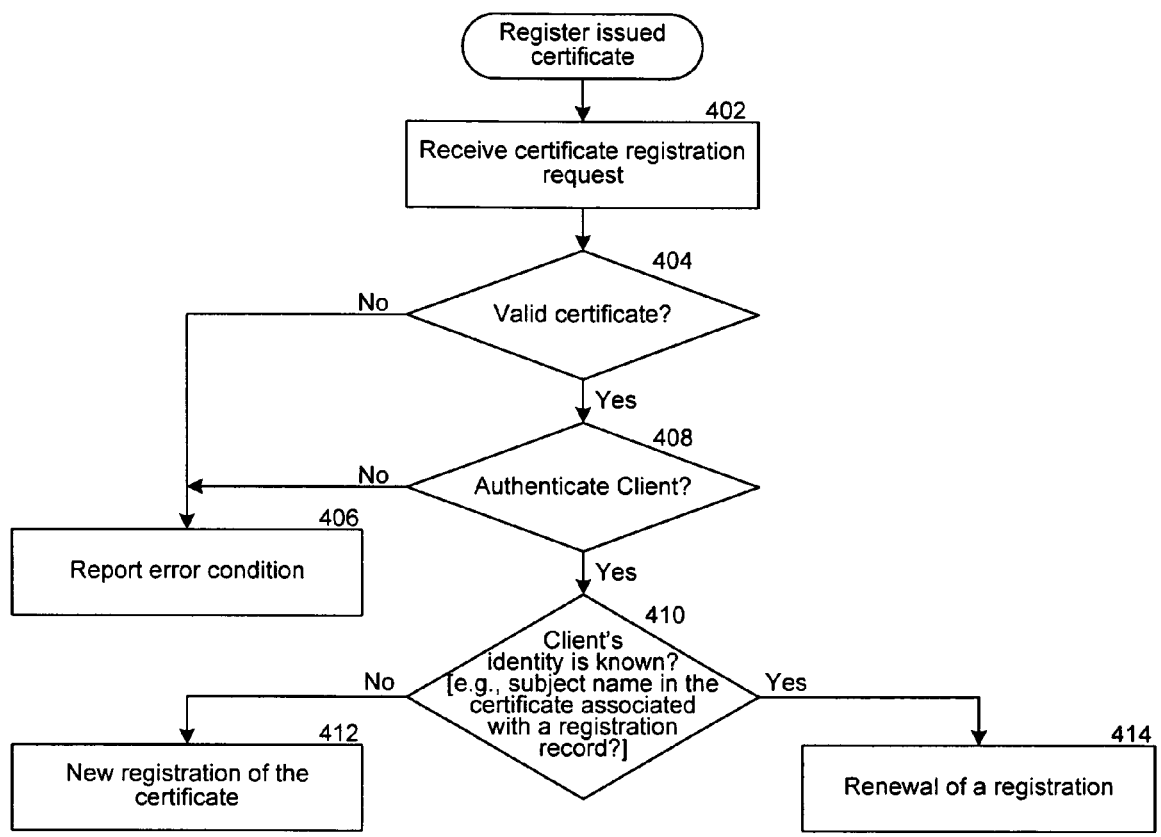
FIG. 4 is a flow diagram that illustrates the processing of a registration service to register a certificate, according to some embodiments.

FIG. 4 is a flow diagram that illustrates the processing of a registration service to register a certificate, according to some embodiments. The registration service may be invoked when the service provider receives a certificate registration request from a client desiring to register with the service provider. Passed along with the certificate registration request is a signature generated by the client requesting registration of the certificate. In block 402, the registration service receives the certificate registration request and the associated signature. In block 404, the registration service checks the certificate passed with the certificate registration request to determine whether the passed certificate is a valid certificate. If the passed certificate is not a valid certificate, the registration service, in block 406, refuses the requested registration and reports the error condition. The registration service may send the client a failed registration response. If, in block 404, the registration service determined that the passed certificate is a valid certificate, then, in block 408, the registration service attempts to authenticate the client that sent the certificate registration request. For example, the registration service can authenticate the client by verifying the signature that is passed with the certificate registration request. If the registration service fails to authenticate the client, the registration service, in block 406, refuses the requested registration and reports the error condition. The registration service may send the client a failed registration response. If, in block 408, the registration service successfully authenticates the client, then, in block 410, the registration service checks to determine if the client (i.e., the client's identity) is known to the registration service or, more particularly, the service provider. For example, the registration service can determine whether the client is known by checking to determine whether a subject name contained in the passed certificate is associated with a registration record in the registration table. The registration record may correspond to a valid registration or an invalid registration (e.g., a revoked registration or an expired registration that has not been purged from the registration table) of a no-certificate registration, a self-issued certificate registration, or an issued certificate registration. If the client is not known to the registration service, then, in block 412, the registration service performs a new or fresh registration of the passed certificate. Otherwise, if the client is known to the registration service, then, in block 414, the registration service performs a renewal of a registration, for example, that is associated with the client and which currently exists in the registration table.

Figure 5:
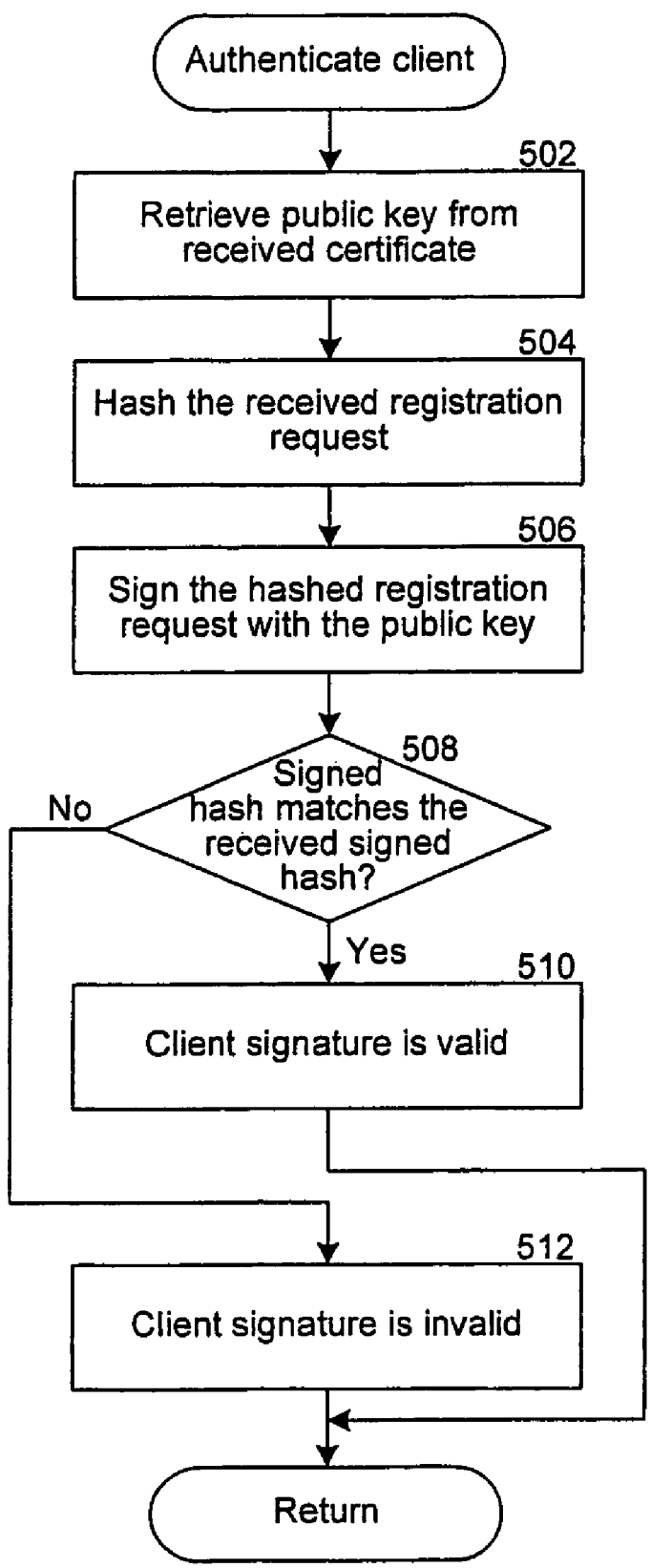
FIG. 5 is a flow diagram that illustrates the processing of the registration service to authenticate a client requesting registration of a certificate, according to some embodiments.

FIG. 5 is a flow diagram that illustrates the processing of the registration service to authenticate a client requesting registration of a certificate, according to some embodiments. In block 502, the registration service retrieves the public key from the received certificate. In block 504, the registration service hashes the received registration request. For example, the registration service hashes the registration request using a predetermined hash function that is agreed upon with the clients. In block 506, the registration service signs the hash value (i.e., the hashed registration request in block 504) with the public key retrieved from the received certificate. In block 508, the registration service compares the signed hashed value (i.e., the signature the registration service created in block 506) to the received signed hash (i.e., the signature received with the certificate registration request). If the two signatures match, then, in block 510, the registration service indicates that the client signature is valid (i.e., client signature is authentic), and returns. Otherwise, if the two signatures do not match, then, in block 512, the registration service indicates that the client signature is invalid (i.e., client signature is not authentic), and returns.

Figure 6:
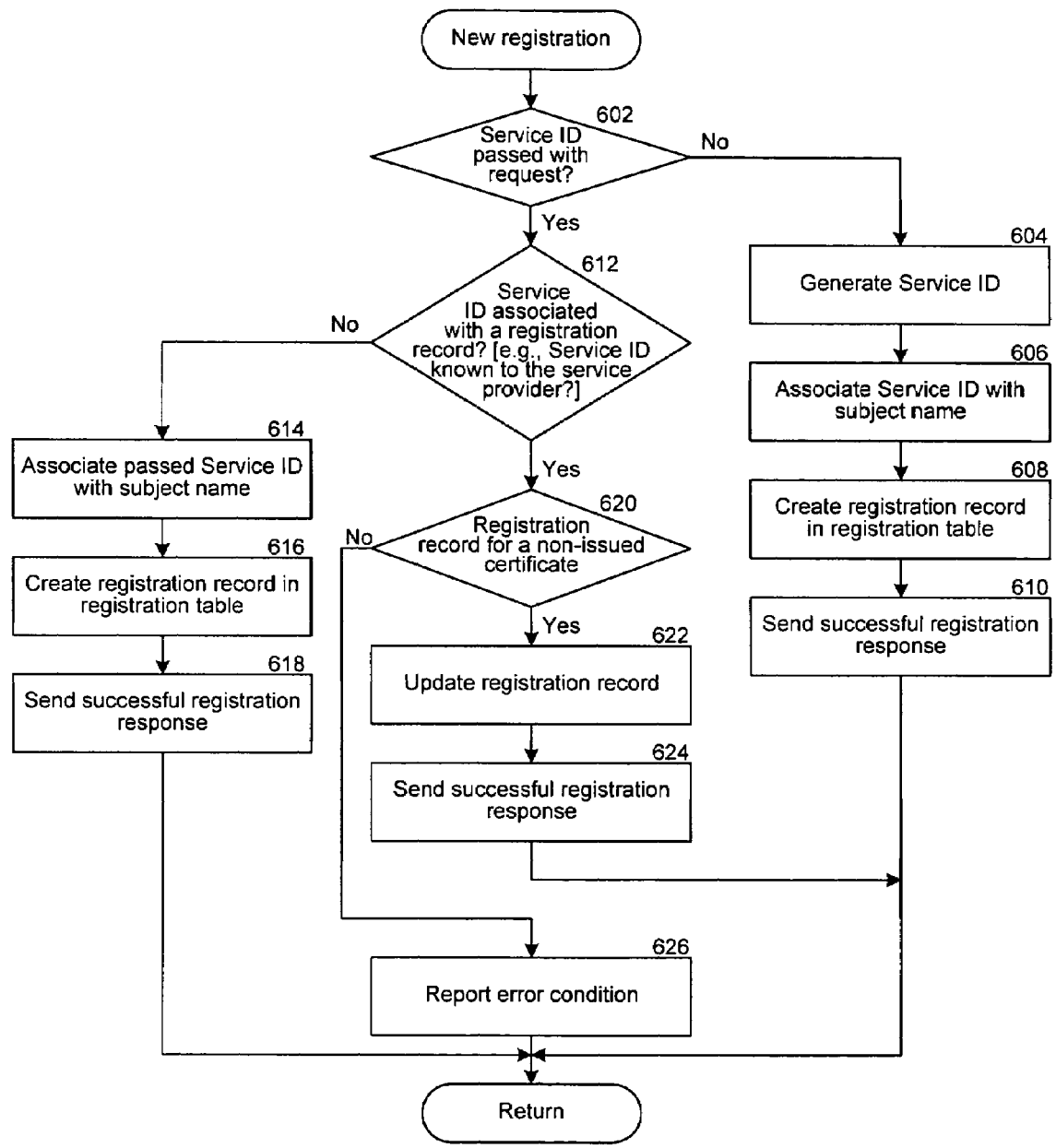
FIG. 6 is a flow diagram that illustrates the processing of the registration service to register a certificate, according to some embodiments.

FIG. 6 is a flow diagram that illustrates the processing of the registration service to register a certificate, according to some embodiments. In block 602, the registration service checks to determine whether a service ID is passed with the certificate registration request. If a service ID is not passed with the certificate registration request, the registration service performs blocks 604 to 610. In this instance, the registration service is going to register the certificate and issue the client a new service ID. In block 604, the registration service generates a new service ID. In block 606, the registration service associates the service ID with the subject name, or other unique token, contained in the certificate. In block 608, the registration service creates a registration record in the registration table to record the certificate registration. For example, the registration service may fill in or complete the service ID field, certificate field, subject name field, and public key field with their appropriate values, and indicate an authorization level of "2" in the authorization level field. In block 610, the registration service sends the client a successful registration response.

If, in block 602, the registration service determined that a service ID is passed with the certificate registration request, then, in block 612, the registration service checks to determine if the service ID is associated with a registration record. Stated differently, the registration service checks to determine whether the service ID is known to the service provider. If the service ID is not associated with a registration record, the registration service performs blocks 614 to 618. In this instance, the registration service is going to register the certificate and issue the client the service ID submitted by the client since the service ID is not currently being used by the service provider. In block 614, the registration service associates the passed service ID with the subject name, or other unique token, contained in the certificate. In block 616, the registration service creates a registration record in the registration table to record the certificate registration. In block 618, the registration service sends the client a successful registration response.

If, in block 612, the registration service determined that the service ID is associated with a registration record, then, in block 620, the registration service checks to determine if the registration record is for a registration involving a non-issued certificate. Stated differently, the registration service checks to determine if the registration record associated with the passed service ID is for a current registration at an authorization level that is lower than an authorization level corresponding to an issued certificate registration. If the registration record is not for a registration involving a non-issued certificate (i.e., the registration record is for a registration of an issued certificate), then, in block 626, the registration service reports the error condition. For example, the registration service may indicate that the certificate registration request is refused because the passed service ID is already assigned to an issued certificate registration. The registration service may also send the client a failed registration response.

If, in block 620, the registration service determined that the registration record is for a registration involving a non-issued certificate, then, in block 622, the registration service updates the registration record. For example, the registration service may fill in or complete the missing fields of the registration record with their appropriate values, and indicate an authorization level of "2" in the authorization level field. In this instance, the registration service is upgrading the authorization level corresponding to the registration of the client from a registration other than an issued certificate registration (e.g., a no certificate registration or a self-issued certificate registration) to an issued certificate registration. In block 624, the registration service sends the client a successful registration response.

Figure 7:
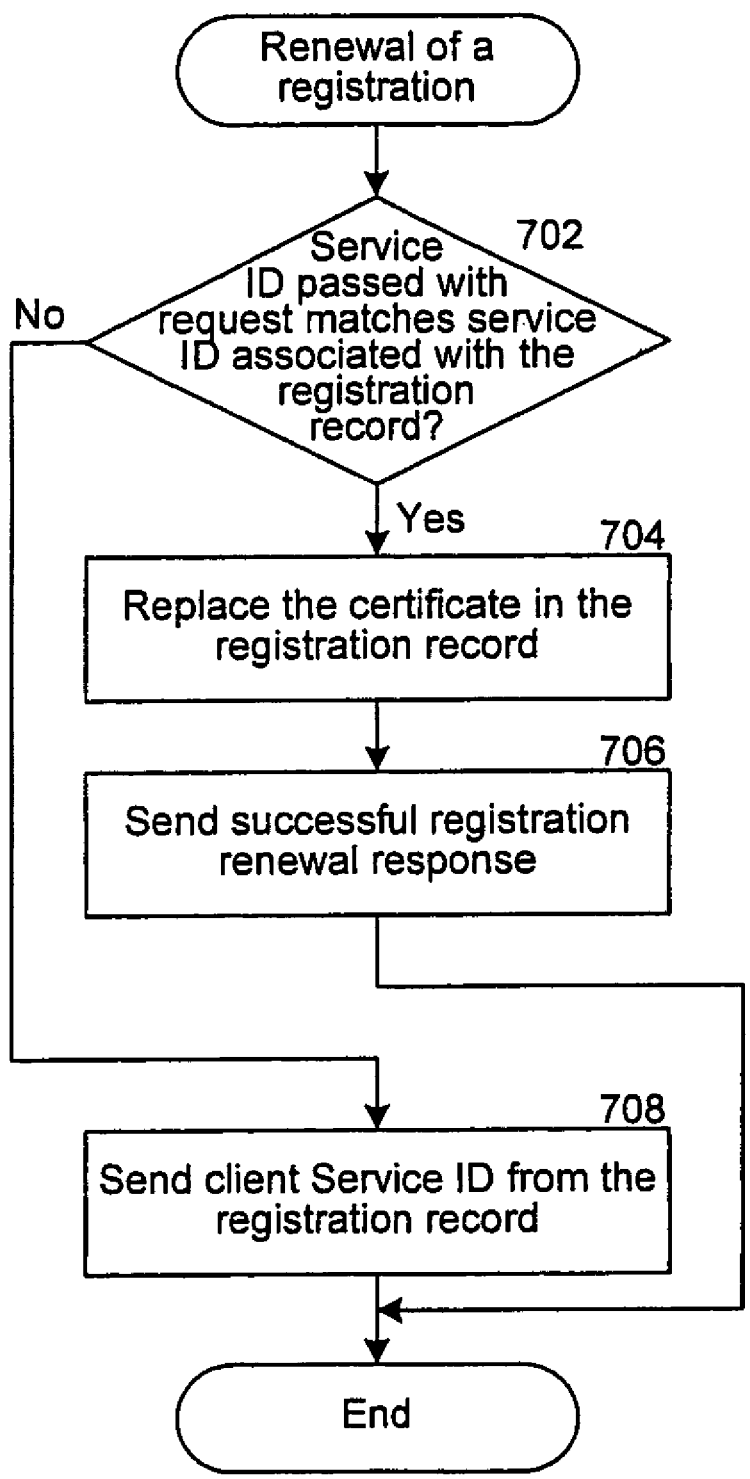
FIG. 7 is a flow diagram that illustrates the processing of the registration service to renew a registration, according to some embodiments.

FIG. 7 is a flow diagram that illustrates the processing of the registration service to renew a registration, according to some embodiments. In block 702, the registration service checks to determine whether the service ID passed with the certificate registration request matches the service ID associated with the registration record. The registration record is the registration record that is associated with the subject name contained in the passed certificate (block 410 in FIG. 4). If the service ID passed with the certificate registration request does not match the service ID associated with the registration record, then, in block 708, the registration service sends the client the service ID from the registration record. In this instance, because the client passed an issued certificate that is currently registered, the registration service is telling the client to use the service ID that is associated with the registration, instead of the passed service ID.

If, in block 702, the registration service determined that the service ID passed with the certificate registration request matches the service ID associated with the registration record, then, in block 704, the registration service replaces the certificate that is contained in or specified by the registration record with the issued certificate passed with the certificate registration request. In this instance, the registration service is renewing the client's registration by updating the registration record to indicate the new issued certificate (i.e., the certificate that was passed with the certificate registration request). In block 706, the registration service sends the client a successful registration renewal response.

Figure 8:
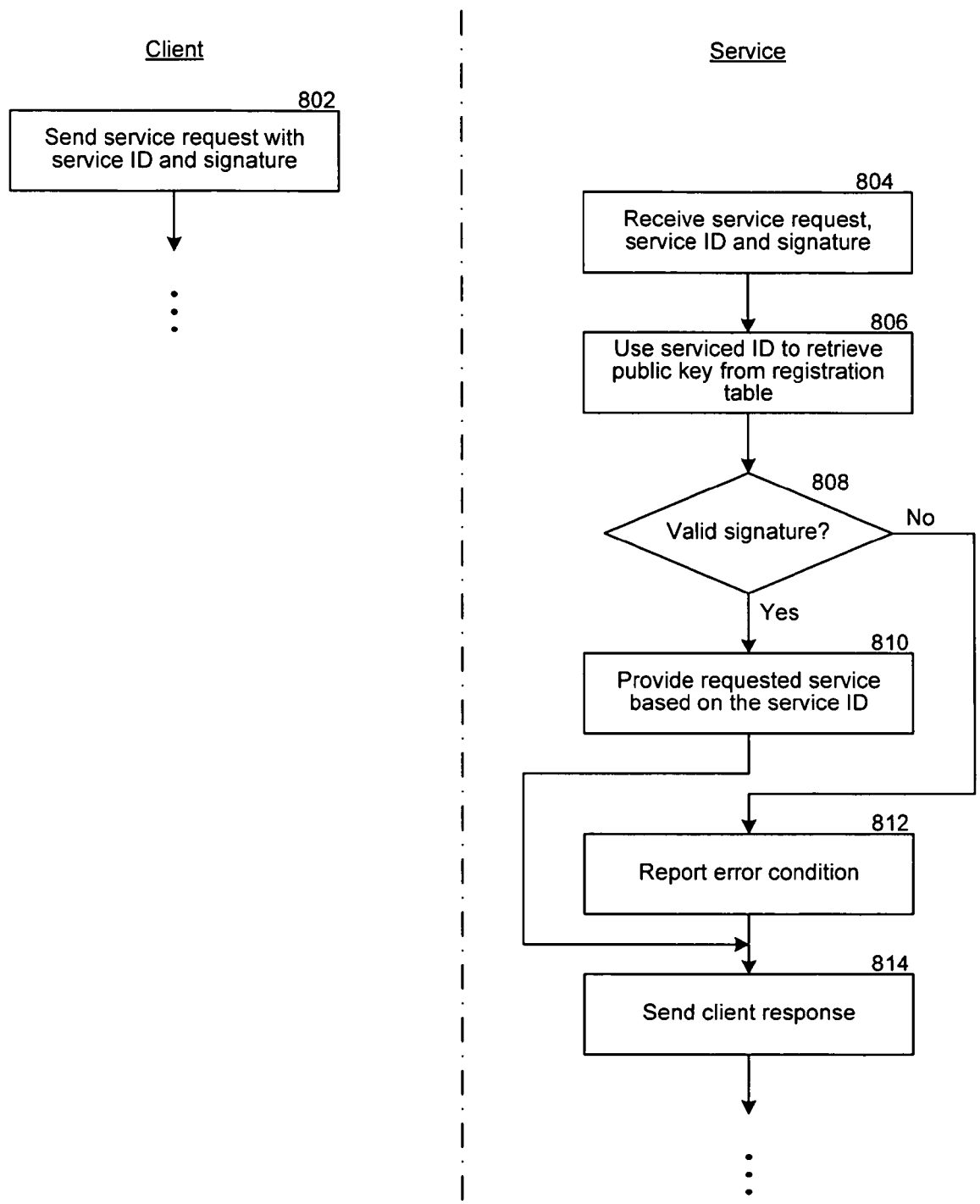
FIG. 8 is a flow diagram that illustrates the use of a service ID and a signature in conjunction with a service request, according to some embodiments.

FIG. 8 is a flow diagram that illustrates the use of a service ID and a signature in conjunction with a service request, according to some embodiments. In block 802, a client sends a service provider a service request with a service ID and a signature. In block 804, the service provider receives the service request, service ID, and signature. In block 806, the service provider uses the service ID to retrieve a public key from the registration table. If the service ID is not present in the registration table, the client requesting the service is not a registered client, and the service provider may send the client a failed service response. Likewise, the service ID may be present in the registration table, but may not have an associated public key (e.g., the registration was a no certificate registration). In block 808, the service provider uses the public key to determine whether the received signature is valid. If the signature is valid, then, in block 810, the service provider provides the requested service based on the passed service ID. For example, the service provider provides the requested service if the requested service is authorized for the passed service ID. Otherwise, if, in block 808, the service provider determines that the signature is invalid, then, in block 812, the service provider reports the error condition. Subsequent to providing the requested service or reporting the error condition, the service provider sends the client an appropriate response in block 814.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computer system with a processor and memory for registering a certificate after issuance of the certificate, the method comprising:
receiving a certificate registration request from a client to register the certificate that has already been issued and that is to be registered, wherein the certificate registration request comprises the certificate and a signature, and wherein the certificate includes a unique token;
determining by the computer system whether the certificate is a valid certificate;
determining by the computer system whether the client is an authentic client based on the signature of the certificate registration request;
determining by the computer system whether the unique token is already associated with a registered certificate; and
when it is determined that the certificate is valid and the client is authentic,
registering the certificate when the unique token is not already associated with a registered certificate, wherein registering the certificate comprises:
determining whether a service ID is included in the certificate registration request;
when it is determined that a service ID is included in the request, determining whether the service ID is associated with a registration record for a less trusted certificate;
when it is determined that the service ID is associated with a registration record for a less trusted certificate, updating the registration record associated with the service ID, wherein the updating the registration record includes indicating that the registration record is for the certificate included in the certificate registration request; and
sending a successful registration response to the client; and
renewing the registration of the certificate when the unique token is already associated with a registered certificate for the authentic client.

2. The method of claim 1, wherein determining whether the certificate is a valid certificate comprises determining whether the certificate is issued by a trusted authority.

3. The method of claim 1, wherein determining whether the certificate is a valid certificate comprises determining that the certificate has not expired.

4. The method of claim 1, wherein determining whether the certificate is a valid certificate comprises determining whether the certificate can be used for client authentication.

5. The method of claim 1, wherein the certificate registration request is encrypted.

6. The method of claim 1, wherein renewing the registration comprises:
determining whether a service ID is included in the certificate registration request; and
when it is determined that a service ID is not included in the request, sending a service ID associated with a registration record that is associated with the unique token associated with the registered certificate to the client.

7. A method in a computer system with a processor and memory for registering a certificate after issuance of the certificate, the method comprising
receiving a certificate registration request from a client to register the certificate that has already been issued and that is to be registered, wherein the certificate registration request comprises the certificate and a signature, and wherein the certificate includes a unique token;
determining by the computer system whether the certificate is a valid certificate;
determining by the computer system whether the client is an authentic client based on the signature of the certificate registration request;
determining by the computer system whether the unique token is already associated with a registered certificate; and
when it is determined that the certificate is valid and the client is authentic,
registering the certificate when the unique token is not already associated with a registered certificate; and
renewing the registration of the certificate when the unique token is already associated with a registered certificate for the authentic client, wherein renewing the registration comprises:
determining whether a service ID that is included in the certificate registration request matches a service ID that is associated with a registration record that is associated with the unique token associated with the registered certificate; and
when it is determined that the service ID that is included in the request does not match the service ID that is associated with the registration record, sending the service ID that is associated with the registration record that is associated with the unique token associated with the registered certificate to the client.

8. The method of claim 7, wherein registering the certificate comprises:
determining that a service ID is passed with the certificate registration request;
determining that the service ID is not associated with a registration record for a registered certificate;
associating the service ID with a unique token associated with the certificate; and
sending a successful registration response to the client.

9. A method in a computer system with a processor and memory for registering a certificate after issuance of the certificate, the method comprising
receiving a certificate registration request from a client to register the certificate that has already been issued and that is to be registered, wherein the certificate registration request comprises the certificate and a signature, and wherein the certificate includes a unique token;
determining by the computer system whether the certificate is a valid certificate;
determining by the computer system whether the client is an authentic client based on the signature of the certificate registration request;
determining by the computer system whether the unique token is already associated with a registered certificate; and
when it is determined that the certificate is valid and the client is authentic,
registering the certificate when the unique token is not already associated with a registered certificate; and
renewing the registration of the certificate when the unique token is already associated with a registered certificate for the authentic client, wherein renewing the registration comprises:
determining whether a service ID that is included in the certificate registration request matches a service ID that is associated with a registration record that is associated with the unique token associated with the registered certificate;
when it is determined that the service ID that is included in the request matches the service ID that is associated with the registration record, replacing a current certificate associated with the registration record with the certificate included in the certificate registration request; and
sending a successful registration response to the client.

10. The method of claim 9, wherein determining whether the client is an authentic client based on the signature comprises:
hashing the received certificate registration request;
signing the hash using a public key included in the certificate; and
comparing the hash signed with the public key with the signature of the certificate registration request.

11. The method of claim 9, wherein registering the certificate comprises:
generating a service ID;
associating the generated service ID with the unique token included in the certificate; and
sending a successful registration response to the client, the successful registration response including the service ID.

12. A computer-readable storage medium containing computer-executable instructions that when executed by a server register certificates after issuance of the certificates, by a method comprising:
receiving a certificate registration request from a client to register a certificate that has already been issued and that is to be registered, wherein the certificate registration request comprises the certificate and a signature, and wherein the certificate includes a subject name;
determining whether the certificate is a valid certificate;
determining whether the client is an authentic client based on the signature of the certificate registration request;
determining whether the subject name included in the certificate is associated with a registration record for a registered certificate;
when it is determined that the subject name included in the certificate is not associated with a registration record for a registered certificate, determining whether a service ID is included in the certificate registration request;
when it is determined that a service ID is included in the certificate registration request,
determining whether the service ID included in the certificate registration request is associated with a registration record for a non-issued certificate; and
when it is determined that the service ID included in the certificate registration request is associated with a registration record for a registered certificate,
updating the registration record associated with the service ID included in the certificate registration request, wherein the updating the registration record includes indicating that the registration record is for the certificate included in the certificate registration request; and
sending a successful registration response to the client; and
when it is determined that a service ID is not included in the certificate registration request,
generating a service ID;
associating the generated service ID with the subject name included in the certificate;
registering the certificate; and
sending a successful registration response to the client, the successful registration response including the service ID.

13. The computer-readable storage medium of claim 12 wherein the method further comprises:
when it is determined that the subject name included in the certificate is associated with a registration record for a registered certificate,
determining whether a service ID is included in the certificate registration request; and
when it is determined that a service ID is not included in the certificate registration request, sending a service ID associated with the registration record to the client.

14. A computer-readable storage medium containing computer-executable instructions that when executed by a server register certificates after issuance of the certificates, by a method comprising:
receiving a certificate registration request from a client to register a certificate that has already been issued and that is to be registered, wherein the certificate registration request comprises the certificate and a signature, and wherein the certificate includes a subject name;

determining whether the certificate is a valid certificate;

determining whether the client is an authentic client based on the signature of the certificate registration request;

determining whether the subject name included in the certificate is associated with a registration record for a registered certificate;

when it is determined that the subject name included in the certificate is associated with a registration record for a registered certificate,
- determining whether a service ID included in the certificate registration request matches a service ID associated with the registration record; and
- when it is determined that the service ID included in the certificate registration request does not match the service ID associated with the registration record, sending the service ID associated with the registration record to the client;

when it is determined that the subject name included in the certificate is not associated with a registration record for a registered certificate, determining whether a service ID is included in the certificate registration request; and when it is determined that a service ID is not included in the certificate registration request,
- generating a service ID;
- associating the generated service ID with the subject name included in the certificate;
- registering the certificate; and
- sending a successful registration response to the client, the successful registration response including the service ID.

15. The computer-readable storage medium of claim 14 wherein the method further comprises:

when it is determined that a service ID is included in the certificate registration request,
- determining whether the service ID included in the certificate registration request is associated with a registration record for a registered certificate; and
- when it is determined that the service ID included in the certificate registration request is not associated with a registration record for a registered certificate,
  - associating the service ID included in the certificate registration request with the subject name included in the certificate; and
  - sending a successful registration response to the client.

16. A computer-readable storage medium containing computer-executable instructions that when executed by a server register certificates after issuance of the certificates, by a method comprising:

receiving a certificate registration request from a client to register a certificate that has already been issued and that is to be registered, wherein the certificate registration request comprises the certificate and a signature, and wherein the certificate includes a subject name;

determining whether the certificate is a valid certificate;

determining whether the client is an authentic client based on the signature of the certificate registration request;

determining whether the subject name included in the certificate is associated with a registration record for a registered certificate;

when it is determined that the subject name included in the certificate is associated with a registration record for a registered certificate,
- determining whether a service ID included in the certificate registration request matches a service ID associated with the registration record;
- when it is determined that the service ID included in the certificate registration request matches the service ID associated with the registration record,
  - replacing a current certificate associated with the registration record with the certificate passed with the certificate registration request; and
  - sending a successful registration response to the client;

when it is determined that the subject name included in the certificate is not associated with a registration record for a registered certificate, determining whether a service ID is included in the certificate registration request; and when it is determined that a service ID is not included in the certificate registration request,
- generating a service ID;
- associating the generated service ID with the subject name included in the certificate;
- registering the certificate; and
- sending a successful registration response to the client, the successful registration response including the service ID.

* * * * *

UNITED STATES PATENT AND TRADEMARK OFFICE
CERTIFICATE OF CORRECTION

| | | |
|---|---|---|
| PATENT NO. | : 7,600,123 B2 | Page 1 of 1 |
| APPLICATION NO. | : 11/318066 | |
| DATED | : October 6, 2009 | |
| INVENTOR(S) | : Gopal Parupudi et al. | |

It is certified that error appears in the above-identified patent and that said Letters Patent is hereby corrected as shown below:

In column 15, line 23, in Claim 14, delete "reguest" and insert -- request --, therefor.

Signed and Sealed this
Eighth Day of February, 2011

David J. Kappos
*Director of the United States Patent and Trademark Office*